E. C. REINDERS.
BARGE FOR HEADERS.
APPLICATION FILED NOV. 19, 1918. RENEWED OCT. 19, 1920.

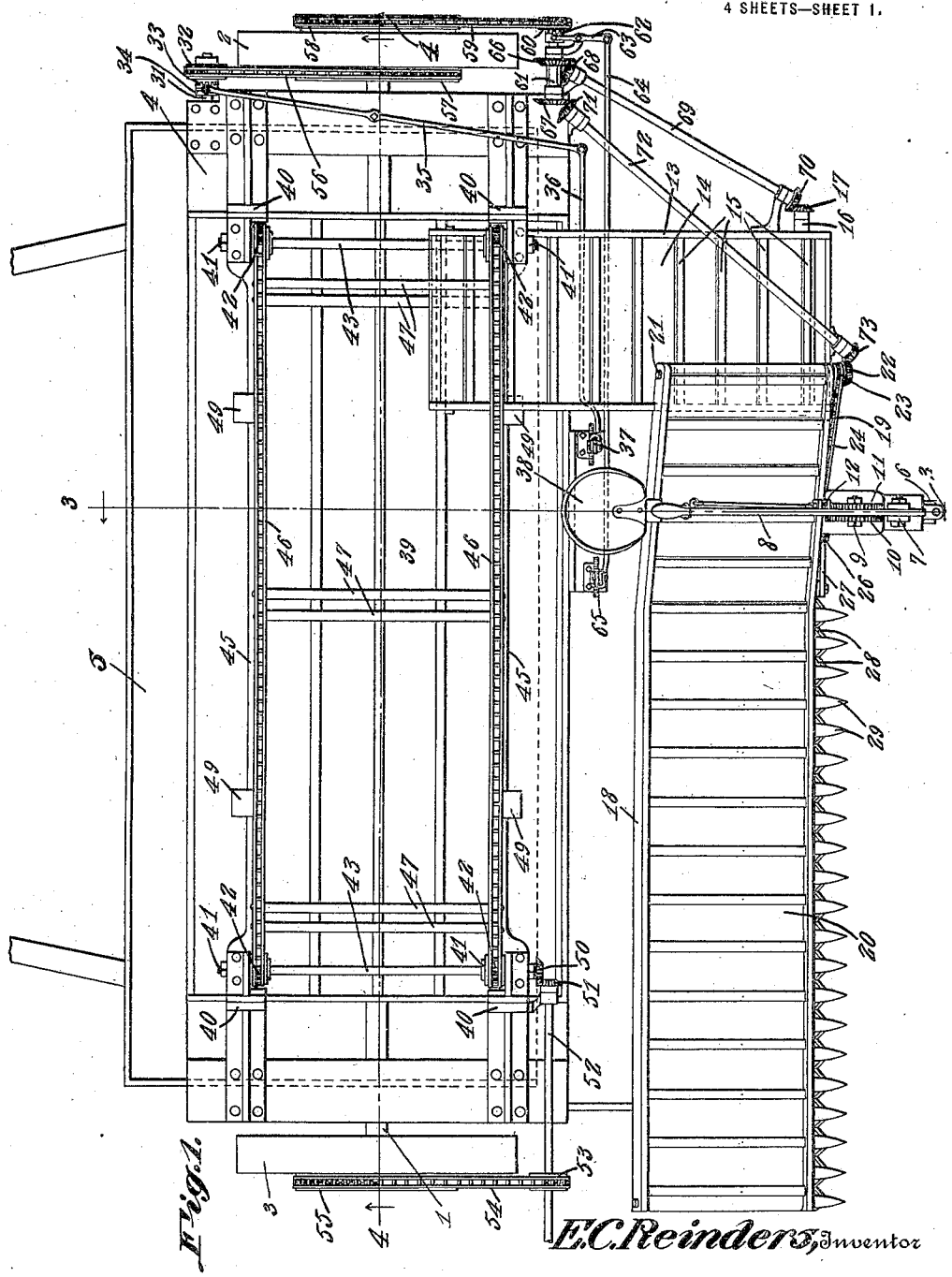

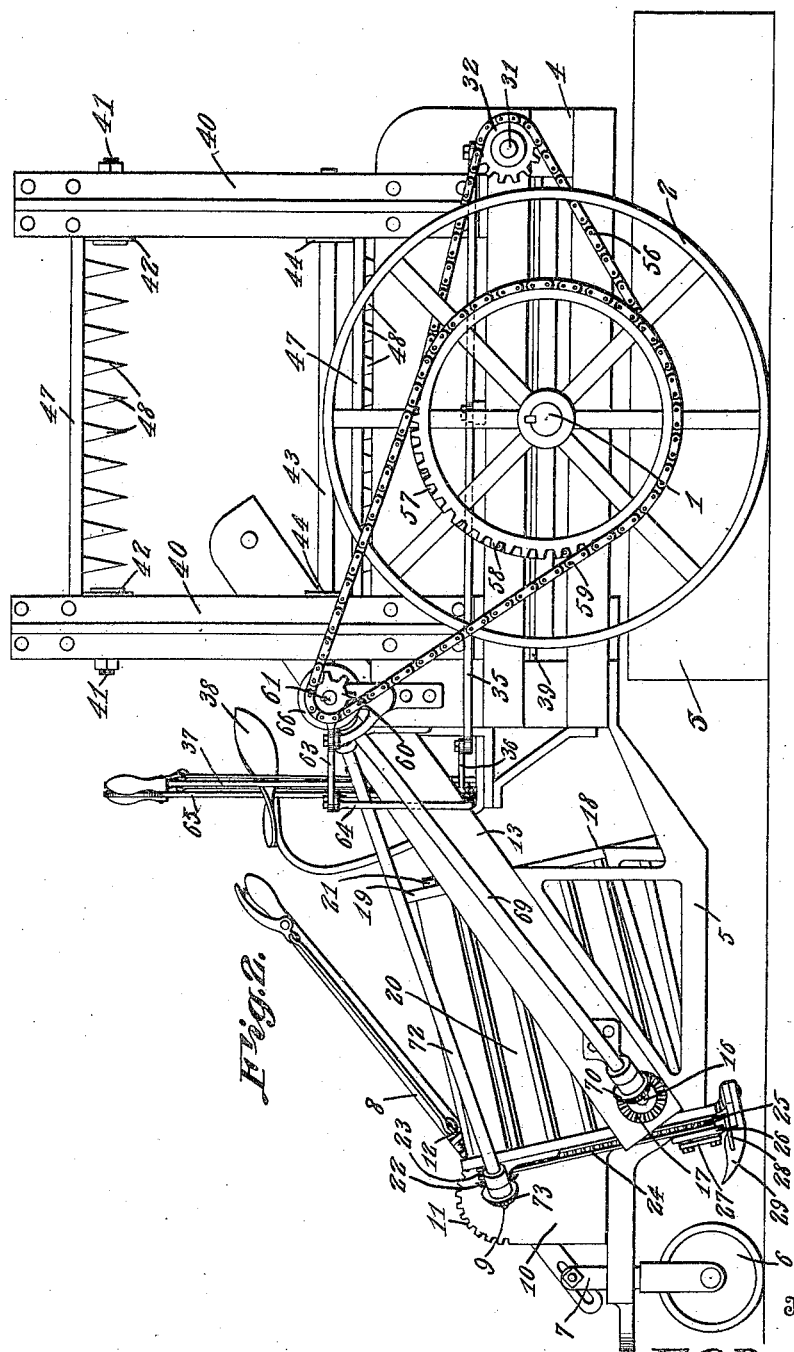

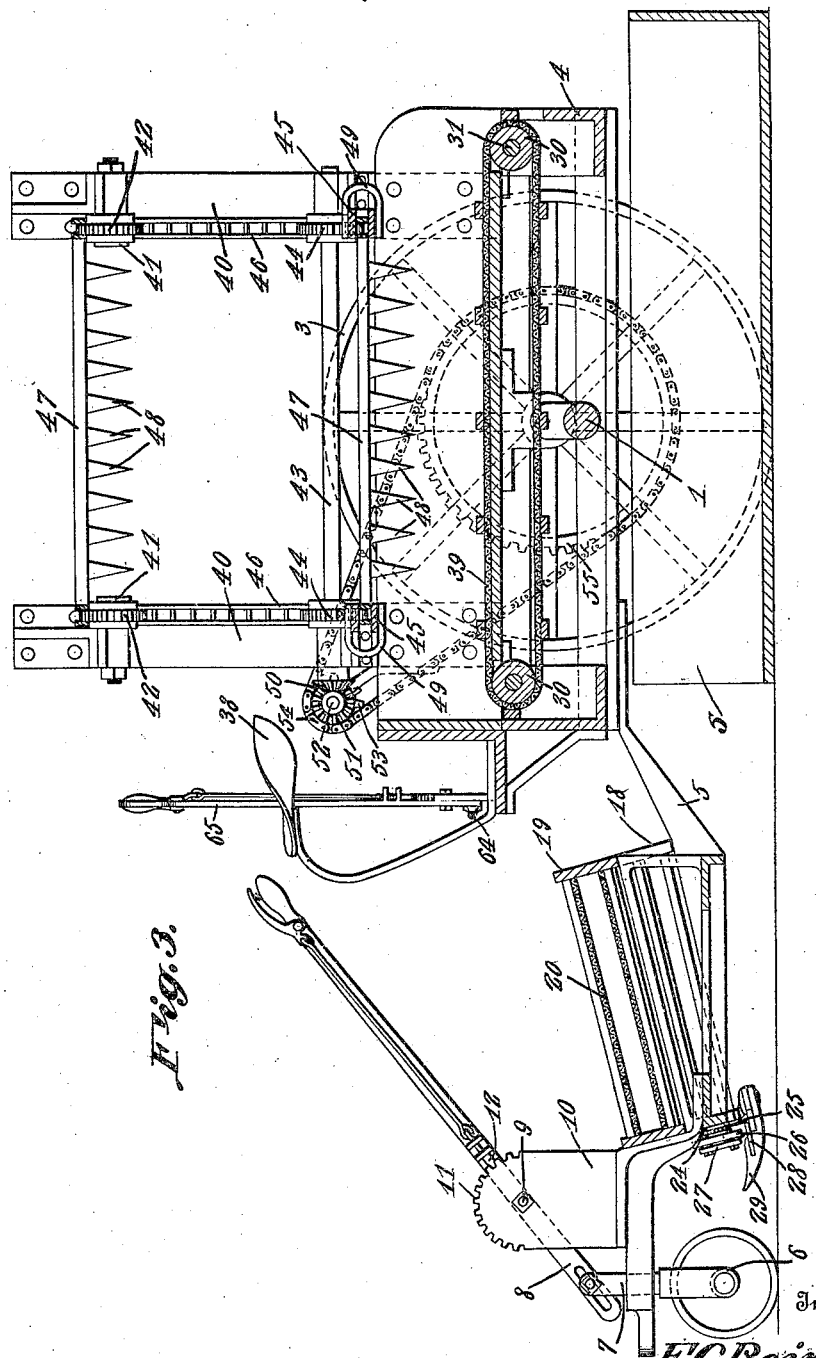

1,363,617.

Patented Dec. 28, 1920.
4 SHEETS—SHEET 4.

UNITED STATES PATENT OFFICE.

EDWARD C. REINDERS, OF ALLIANCE, NEBRASKA.

BARGE FOR HEADERS.

1,363,617.     Specification of Letters Patent.     Patented Dec. 28, 1920.

Application filed November 19, 1918, Serial No. 263,166. Renewed October 19, 1920. Serial No. 418,097.

*To all whom it may concern:*

Be it known that I, EDWARD C. REINDERS, a citizen of the United States, residing at Alliance, in the county of Box Butte and State of Nebraska, have invented a new and useful Barge for Headers, of which the following is a specification.

This invention relates to headers and more especially to a barge for use in connection therewith whereby the harvested material can be evenly distributed in the barge and then bodily discharged into the waiting head of a stacker placed under the machine, thereby saving the time and material heretofore wasted in the operation of stopping the cutting of grain, proceeding to a stack, unloading, and then returning to the cutting operation. In the present instance it is intended that the stacker shall travel back and forth between the stack and the header, receiving the accumulated load from the harvester or header without interrupting the harvesting operation, and then removing the material to the stack.

With the foregoing and other objects in view which will appear as the description proceeds, the invention consists of certain novel details of construction and combinations of parts which will be hereinafter more fully described and pointed out in the claims it being understood that various changes may be made in the construction and operation of the parts without departing from the spirit or sacrificing any of the advantage of the invention as set forth in the appended claims.

In the accompanying drawings the preferred form of the invention has been shown.

In said drawings

Figure 1 is a plan view of the machine, a portion of a stacker being shown in position under the barge of the header.

Fig. 2 is a side elevation.

Fig. 3 is a section on line 3—3, Fig. 1.

Fig. 4 is a section on line 4—4, Fig. 1.

Referring to the figures by characters of reference, 1 designates a drop axle supported by wheels 2 and 3, and on this axle is mounted a frame 4 of any suitable construction. This frame has a forward extension 5 supported by a caster 6, the stem 7 of which is slidable in the extension and is adapted to be slidably engaged by one end of a lever 8 fulcrumed at 9 upon a standard 10 secured on the extension. A rack 11 is provided on the standard and is to be engaged by a dog 12 on the lever. Thus by shifting the lever the extension 5 can be raised and lowered, the dog and rack serving to hold the parts in any positions to which they may be adjusted.

Secured to the extension at one side of the machine is an inclined elevator frame 13 supporting an endless inclined elevator 14 preferably provided with cross cleats 15, the lower portion of the elevator being mounted on a shaft 16 extending transversely through the frame 13 and provided at one end with a gear 17.

Supported by the extension 5 and extending transversely of the machine, is a conveyer frame 18 inclined downwardly and forwardly and having one end elevated so as to extend over the lower end portion of the elevator 14 and its frame 13. This elevated end has been shown at 19. An endless conveyer 20 is arranged in the frame 18 and its extension 19 and one end thereof is mounted on and receives motion from a shaft 21 provided at its forward end with a gear 22 and a sprocket 23. The sprocket transmits motion, through a chain 24 to a sprocket 25 located under one end of the frame 18 and which rotates with a disk 26. A pitman 27 transmits motion from the disk to a reciprocating sickle bar 28 mounted in fingers 29, as ordinarily. Thus when grain is harvested by the sickle bar it will fall onto the conveyer 20 and be carried transversely of the machine thereby and deposited on the elevator, 14.

Journaled in the frame 4 at the front and back thereof are rolls 30, the rear roll being secured on a shaft 31 provided at one end with a sprocket 32. This sprocket is loose on the shaft and has a clutch member 33 adapted to be engaged by a clutch member 34 featured on the shaft 31. A lever 35 engages the clutch member 34 and has one end connected by a rod 36 to a lever 37 located adjacent to the seat 38 occupied by the operator. An endless conveyer 39 is mounted on the rolls 30 and, as the clutch members 33 and 34 are normally disengaged, the conveyer is normally at rest. This conveyer extends through the greater portion of the width of the frame 4 and under the delivery end of the elevator so that, as material is discharged from the elevator, it will drop onto the said conveyer 39.

Erected above the frame 4 adjacent the ends of the rolls 30 are standards 40 provided, at their upper ends, with studs 41 on which are secured sprockets 42. Shafts 43 connect the standards at points below the studs 41 and have sprockets 44 located at the ends of tracks 45 each formed of upper and lower rails. Endless chains 46 are mounted on the sprockets 42 and 44 and are connected by rods 47 having depending teeth 48. The rods are pivotally connected to the chains so that the teeth will hang downwardly at all times and, when the ends of the rods are traveling between the upper and lower rails of the tracks 45, they will be held against rotation, thus holding the teeth positively in downwardly extending positions. The upper and lower rails of each track are connected at intervals by U-brackets 49 and the ends of the rods 47 can pass these brackets without interference.

One of the shafts 41 is provided with a gear 50 meshing with a gear 51 secured to a transverse shaft 52 and motion is transmitted to said shaft 52 through a sprocket 53, a chain 54 and a large sprocket 55 on the wheel 3. Thus during the forward movement of the machine the teeth 48 are moved downwardly at the elevator side of the machine and thence laterally to the other side of said machine, thus to operate as a spreader for equally distributing over the conveyer 39 the material discharged from the elevator 14.

Sprocket 32 is continuously operated by a chain 56 driven by a sprocket 57 secured to the wheel 2. Another sprocket 58 is secured to said wheel and transmits motion through a chain 59 to a sprocket 60 loosely mounted on a shaft 61. A clutch 62 made up of fixed and movable members is arranged on the shaft and, when they are engaged, they lock the sprocket 60 to said shaft 61. They are adapted to be disengaged by a lever 63 which is connected to one member of the clutch and which lever is connected by a rod 64 to a hand lever 65 adjacent the seat 38.

Secured to the shaft 61 are separate gears 66 and 67. Gear 66 meshes with a gear 68 secured to a shaft 69 having a gear 70 which meshes with the gear 17. The gear 67 meshes with a gear 71 secured to a shaft 72 which has a gear 73 meshing with the gear 22.

From the foregoing description it will be apparent that when the machine moves forward, the spreading teeth 48 will be operated in the manner already described. Sprockets 60 and 32 will be rotated continuously during the movement of the machine. By means of the clutch 62 the harvesting, conveying and elevating mechanism can be operated as described. The harvested material will be delivered onto the conveyer 39 and distributed thereover as heretofore set forth. A stacker, the head of which has been shown generally at S, can be brought to position with its head under and back of the rear portion of conveyer 39 while the machine is moving forward and harvesting, said stacker following after, if necessary. When the head of the stacker is brought to load receiving position the clutch 34 is shifted to couple the conveyer 39 to its operating mechanism. Thus as the machine moves forward the conveyer 39 will shift the load rearwardly and into the head of the stacker S, and which head is left stationary during this operation. Thus the load will be delivered to all portions of the head of the stacker and when the load has been delivered, the clutch member 34 can be shifted to uncoupled position. Another load can then be accumulated, the machine moving forwardly continuously during the unloading operation. As soon as the stacker receives the load it is moved back to the stack, delivers the load thereto and then returns to the working harvester where another load is received without interrupting the harvesting operation.

What is claimed is:—

1. The combination with harvesting mechanism, and a transversely movable conveyer for receiving material therefrom extending throughout the width of the cut, of a normally stationary conveyer, an endless series of toothed members having upper and lower flights supported above the normally stationary conveyer, means for elevating harvested material from the first named conveyer and delivering it between the upper and lower flights of the series of toothed bars and through the lower flight of said series onto the normally stationary conveyer, and means for operating the normally stationary conveyer at will for delivering the accumulated material from the machine.

2. The combination with harvesting mechanism, of a receiving conveyer movable transversely of the path of movement of the machine and adapted to receive cut material from said mechanism, a normally stationary delivering conveyer, an endless spreader having upper and lower flights supported above the delivering conveyer, means for elevating cut material from the collecting conveyer and discharging it between said upper and lower flights to direct the cut material through the lower flight and onto the delivering conveyer, and means for operating the delivering conveyer at will to discharge the accumulated material from the machine.

3. The combination with a movably supported structure, harvesting mechanism thereon, and a collecting conveyer for receiving cut material from the harvesting mechanism, said conveyer being movable transversely of the machine, of a normally stationary delivering conveyer adapted to move along lines parallel with the path of movement of the machine, an endless spreading device having upper and lower flights supported above said delivering conveyer, means for elevating cut material from the collecting conveyer and into the space between the upper and lower flights of the spreading machine to deposit said material through the lower flight and onto the delivering conveyer, a stationary receptacle under the wheel supported structure, and means under the control of the operator for actuating the delivering conveyer during the forward movement of the machine to deposit the accumulated material therefrom and into the stationary receptacle from one end to the other thereof.

4. In a machine of the class described the combination with harvesting mechanism, and a collecting conveyer movable transversely of the path of movement of the machine for receiving cut material from the harvesting mechanism, of a rearwardly movable delivering conveyer, means for elevating cut material from the receiving conveyer and depositing it on the delivering conveyer, spreading means above and movable transversely of the delivering conveyer and movable over and under the delivery end of the elevating means, and means for operating the delivering conveyer at will to discharge accumulated material from the machine.

In testimony that I claim the foregoing as my own, I have hereunto affixed my signature in the presence of two witnesses.

EDWARD C. REINDERS.

Witnesses:
M. J. Cox,
Geo. McCawley.